US007480077B2

(12) United States Patent
Peeters

(10) Patent No.: US 7,480,077 B2
(45) Date of Patent: Jan. 20, 2009

(54) BILLING PROCESS FOR PRINTING SYSTEMS

(75) Inventor: Bert Peeters, Venray (NL)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/878,239

(22) Filed: Jul. 23, 2007

(65) Prior Publication Data

US 2007/0265925 A1 Nov. 15, 2007

Related U.S. Application Data

(63) Continuation of application No. 10/046,216, filed on Jan. 16, 2002.

(51) Int. Cl.
*G06F 15/00* (2006.01)
*G06F 17/00* (2006.01)
*H04N 1/21* (2006.01)
*G03G 21/02* (2006.01)
*G06M 3/08* (2006.01)

(52) U.S. Cl. .................... 358/1.9; 358/296; 358/1.1; 358/1.15; 399/79; 399/80; 399/81; 705/400; 377/13; 377/15

(58) Field of Classification Search .......... 358/1.9, 358/518, 1.1, 1.15, 296; 705/39–40, 42, 705/34, 14, 19–20, 400; 399/8, 79, 81, 1, 399/403, 80; 377/13, 15; 704/300, 301, 704/303, 310, 312–316, 328
See application file for complete search history.

(56) References Cited

U.S. PATENT DOCUMENTS

| 5,146,344 A * | 9/1992 | Bennett et al. ............. 358/296 |
| 5,383,129 A * | 1/1995 | Farrell ........................ 705/400 |
| 5,745,883 A * | 4/1998 | Krist et al. .................... 705/34 |
| 5,802,496 A | 9/1998 | Uchiyama |
| 6,516,157 B1 * | 2/2003 | Maruta et al. ................. 399/8 |
| 6,650,433 B1 * | 11/2003 | Keane et al. ............... 358/1.15 |
| 7,072,850 B1 * | 7/2006 | Van Luchene ............... 705/14 |
| 7,158,946 B2 | 1/2007 | Sato et al. |
| 2002/0069168 A1 * | 6/2002 | Lee et al. ..................... 705/40 |

(Continued)

FOREIGN PATENT DOCUMENTS

JP  A 2001-148055  5/2001

(Continued)

*Primary Examiner*—Edward L Coles
*Assistant Examiner*—Charlotte M Baker
(74) *Attorney, Agent, or Firm*—Oliff & Berridge, PLC

(57) ABSTRACT

The present invention provides a paperless billing process for enabling expedited and simplified payments of print volume bills by customers of printing systems. A method of performing a billing process for the copies or prints produced by customer of a printing system is provided where the printing system comprises a memory that stores product usage data indicating a measurement of the actual use of the printing system. The printing system first accesses the memory to retrieve the product usage data. Then, the printing system calculates billing data using the retrieved product usage data. A bill is presented to the customer based on billing data, and the printing system receives user input from the customer indicating whether the customer authorizes the billing data. If so, a message is sent from the printing system to a billing service, wherein the message includes information indicating the authorized billing data. Thus, the bills are generated locally by the printing system using the printer user interface.

19 Claims, 7 Drawing Sheets

U.S. PATENT DOCUMENTS

| | | |
|---|---|---|
| 2003/0004886 A1 | 1/2003 | Chandar et al. |
| 2003/0055876 A1 | 3/2003 | Korala et al. |
| 2003/0074312 A1 * | 4/2003 | White ......................... 705/40 |
| 2003/0149661 A1 * | 8/2003 | Mitchell et al. ............... 705/39 |

FOREIGN PATENT DOCUMENTS

| | | |
|---|---|---|
| JP | A 2001-160023 | 6/2001 |
| JP | A 2001-305920 | 11/2001 |

* cited by examiner

BILLING PROCESS FOR PRINTING SYSTEMS

This is a Continuation of application Ser. No. 10/046,216 filed Jan. 16, 2002. The disclosure of the prior application is hereby incorporated by reference herein in its entirety.

BACKGROUND OF THE INVENTION

1. Field of the Invention

The invention generally relates to printing systems, and in particular to the process of billing for the copies or prints produced by a customer of a printing system.

2. Description of the Related Art

Current printing systems such as electronic reprographic systems, copying machines or electronic printing machines are typically capable of counting pages. For customer records or for billing purposes, these systems comprise accounting mechanisms for computing the number of pages that are printed. Besides the copy count, these systems may further acquire other information for billing purposes such as measurements of the actual use of a wide range of system functions, including binding, scanning, stapling, stitching, shrink wrapping, etc. Further, the paper and toner consumption can be monitored. This information can then be used when generating the bill.

FIG. 1 illustrates the basic components of a conventional printing system. The printing system is controlled by controller 100 that receives image data from scanner 110 and outputs printing data to the printer 150. The printer 150 comprises a paper supply and a finisher for performing the above mentioned system functions.

The controller 100 includes an image input control 120 and image output control 140 for controlling the image data transfer from and to the system control 130. Further, there is a user interface 160 provided that may be a liquid crystal display or another kind of mini display in front of the printing system. The controller 100 further includes a memory 170 for storing product usage data indicating measurements of the actual use of the printing system, such as copy counts. Further, the controller 100 may include a network interface 180 for connecting the printing system to a local or global network or to a phone line.

A conventional billing process of such a printing system according to the prior art is illustrated in FIG. 2. The process starts with step 210 in which the customer reads the copy count. The customer then sends a hard copy document to the billing service in step 220 for getting the copy count over to the billing service, and the billing service generates a bill (step 230). The generated hard copy bill is then sent back to the customer in step 240, and the customer can now authorize the bill (step 250). If the customer authorizes the bill he initiates payment, for instance by sending a check or an authorization to debit from his account, to the billing service (step 260).

Another billing process according to the prior art is depicted in FIG. 3. In this process, the printing system transmits product usage information to the billing service via a phone line (step 310). The billing service then generates a bill based on the received information and sends the bill to the customer via a phone line in step 320. Then, the customer authorizes the bill and sends the authorized bill back to the billing service.

While the billing process of FIG. 3 improves over that of FIG. 2 in sending the data electronically via phone line, one draw back is still that a total number of three transmissions are required to perform one billing. As can be seen from FIG. 4, the prior art requires first to send product usage information from the printing system to the billing service, then send a bill from the billing service to the customer of the printing system, and finally send an authorization from the customer of the printing system to the billing service. Even if these steps were performed electronically, the process is susceptible to errors in each transmission. In case of transmission errors in at least one of the steps, the billing process cannot be reliably performed anymore. Further, it might be necessary to repeat a transmission what might delay the process.

SUMMARY OF THE INVENTION

The present invention has been made in consideration of the above situation, and provides a method of performing a billing process for the copies or prints produced by a customer of a printing system. The printing system comprises a memory storing product usage data indicating a measurement of the actual use of the printing system. The method comprises: 1) in the printing system, accessing the memory to retrieve the product usage data; 2) calculating billing data using the retrieved product usage data; 3) presenting a bill to the customer based on the billing data; 4) receiving user input from the customer indicating whether the customer authorizes the billing data; and 5) if the user input indicates that the customer has authorized the billing data, sending a message from the printing system to a billing service, where the message includes information indicating the authorized billing data.

It is further provided a printing system that comprises: a) a memory storing product usage data indicating a measurement of the actual use of the printing system by a customer; b) a billing control unit for accessing the memory to retrieve said product usage data, and for calculating billing data using the retrieved product usage data; c) a user interface message delivery subsystem for presenting a bill to the customer based on said billing data and for receiving user input from the customer indicating whether the customer authorizes the billing data; and d) a message sending unit for sending a message from the printing system to a billing service if said user input indicates that the customer has authorized the billing data, the message including information indicating the authorized billing data.

BRIEF DESCRITION OF THE DRAWINGS

The accompanying drawings are incorporated into and form a part of the specification to illustrate several embodiments of the present invention. These drawings together with the description serve to explain the principles of the invention. The drawings are only for the purpose of illustrating examples of how the invention can be made and used and are not to be construed as limiting the invention to only the illustrated and described embodiments. Further features and advantages will become apparent from the following and more particular description of the various embodiments of the invention, as illustrated in the accompanying drawings, wherein:

DETAILED DESCRIPTION OF THE INVENTION

The illustrative embodiments of the present invention will now be described with reference to the figure drawings wherein like elements and structures are indicated by like reference numbers.

Figure 1:
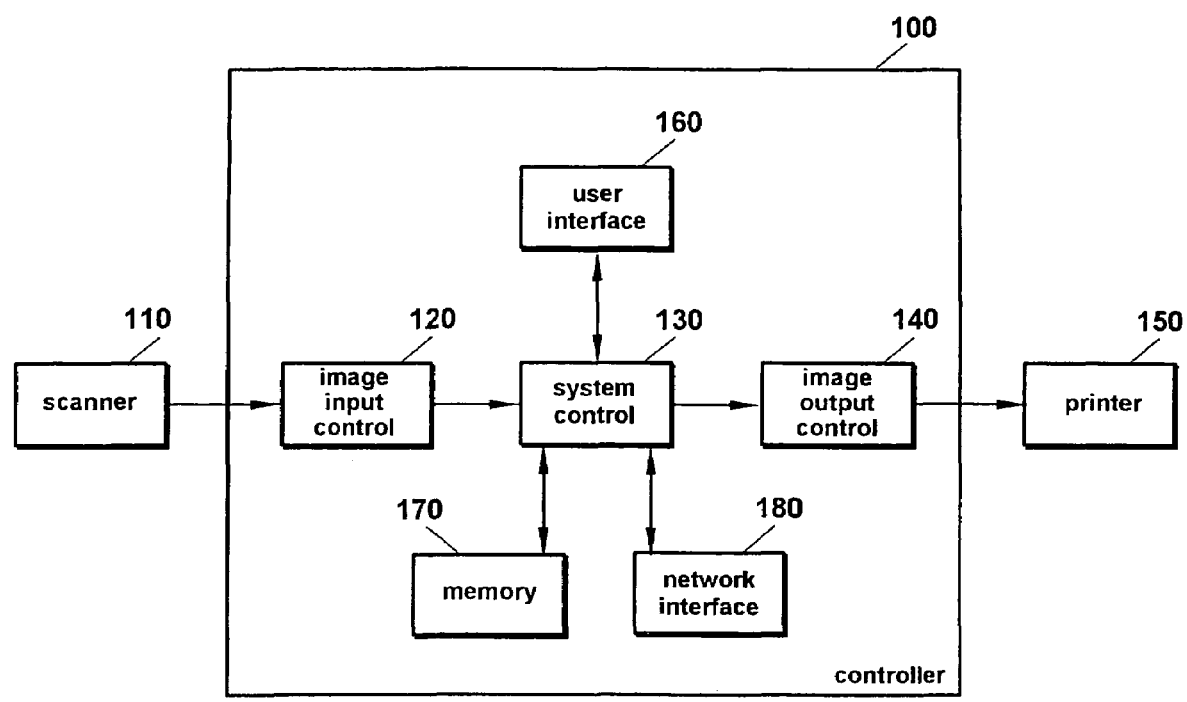
FIG. 1 illustrates a printing system according to the prior art.
Figure 2:
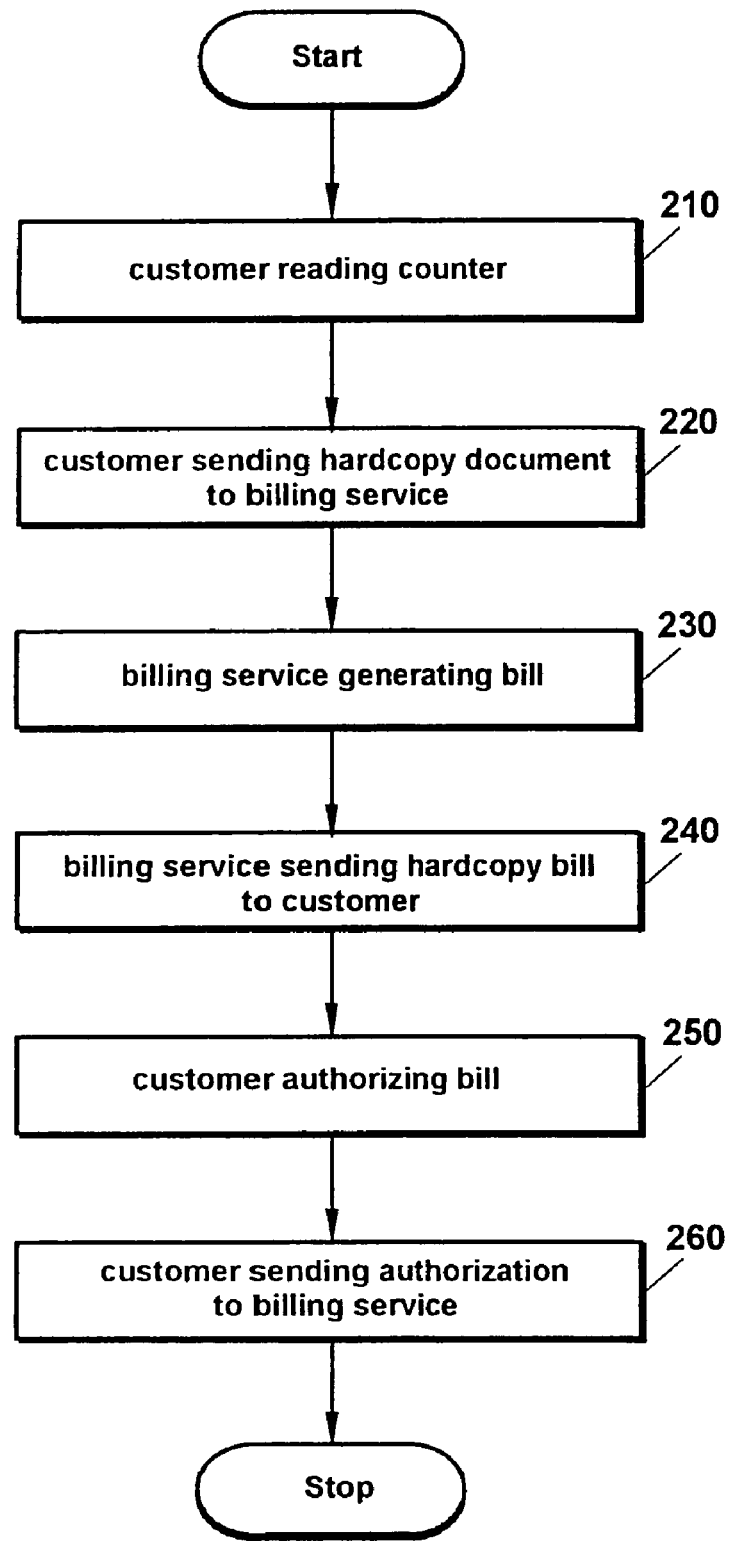
FIG. 2 is a flowchart illustrating a first billing process according to the prior art.
Figure 3:
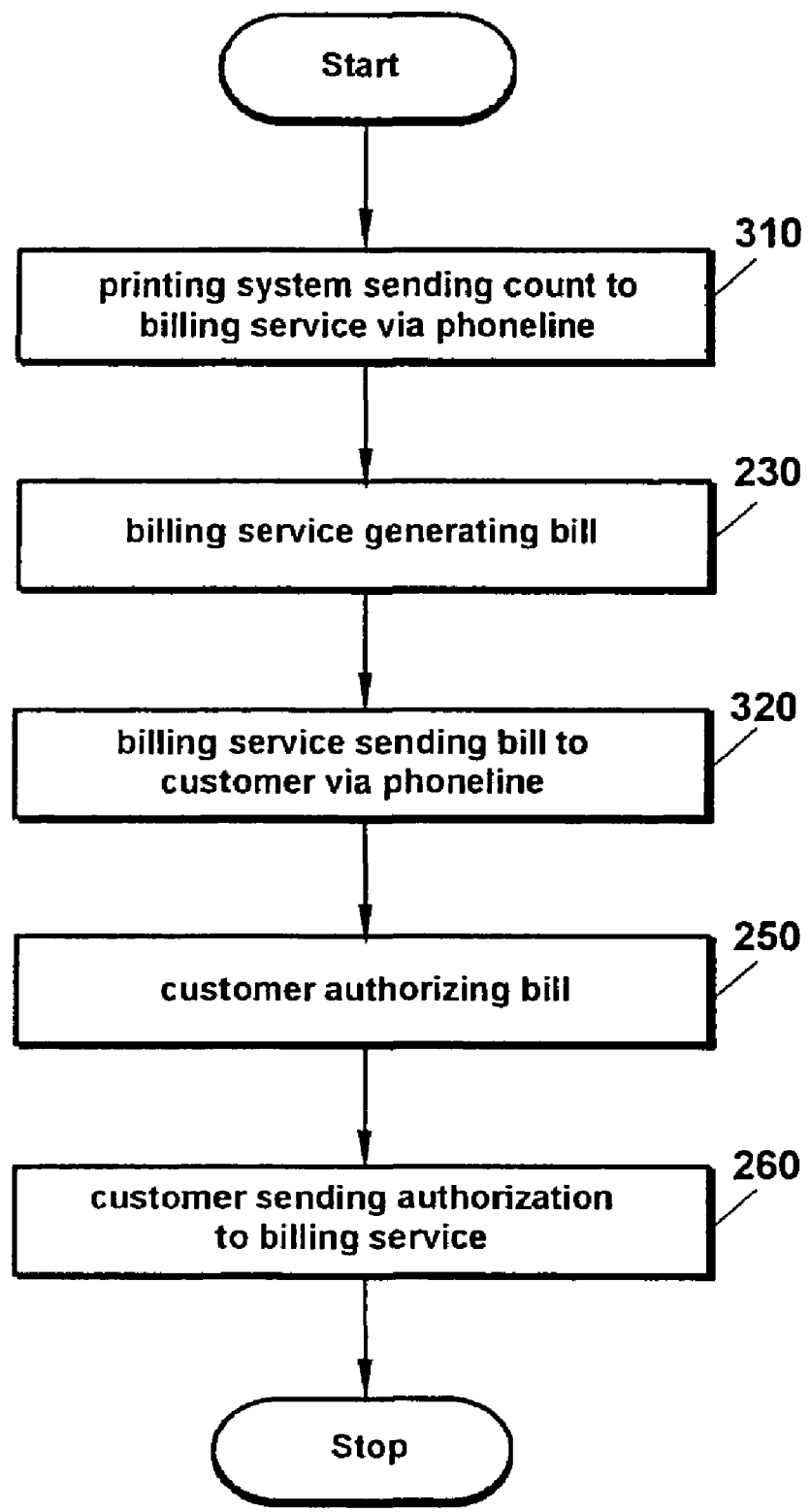
FIG. 3 is a flowchart illustrating a second billing process according to the prior art.
Figure 4:
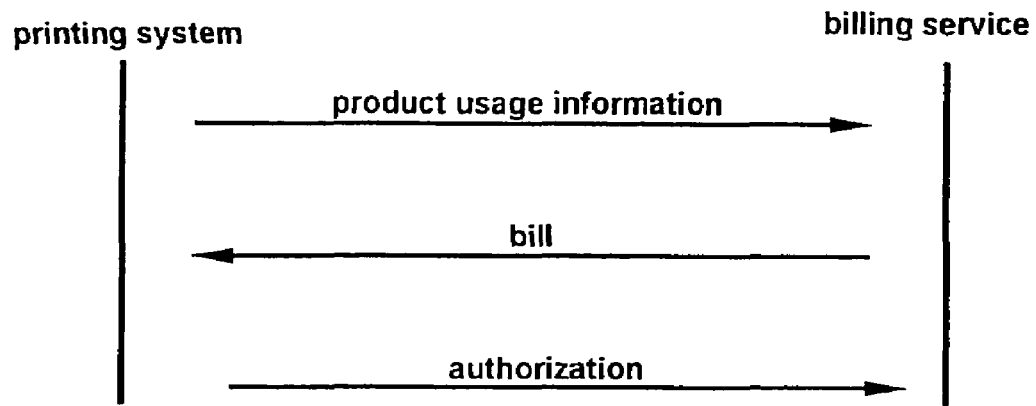
FIG. 4 is a sequence diagram illustrating the information flow of the billing processes according to the prior art.
Figure 5:
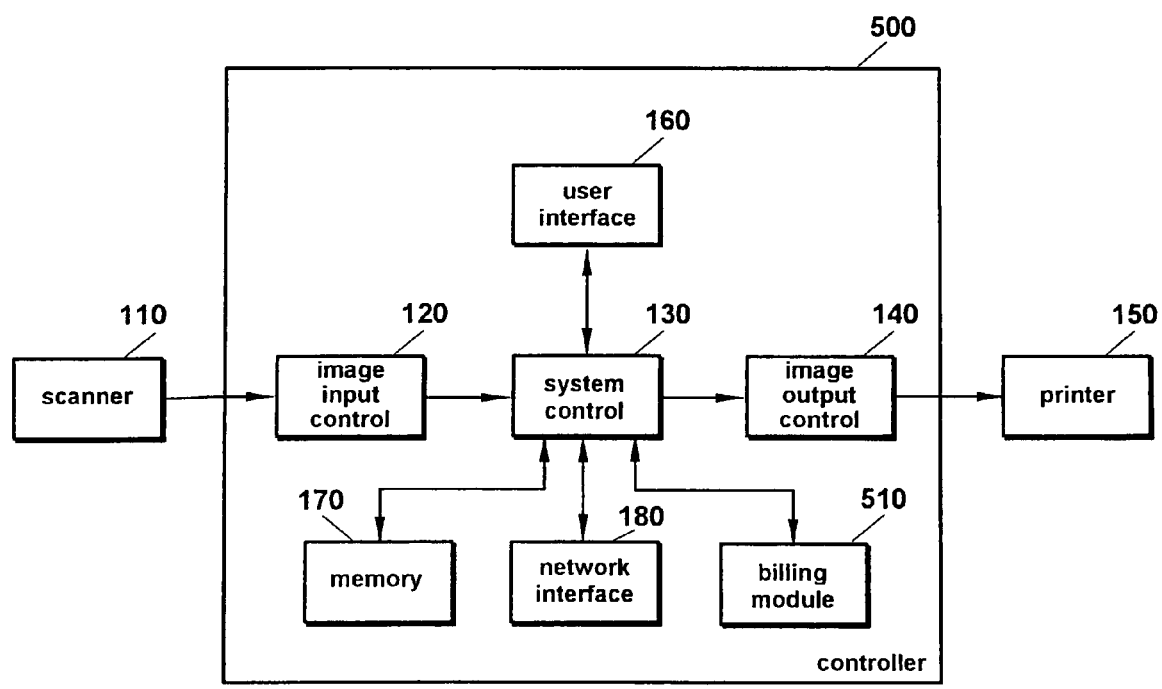
FIG. 5 illustrates a printing system according to an embodiment of the present invention.

Referring now to the drawings and in particular to FIG. 5 which illustrates a printing system according to an embodiment of the present invention, the system differs from that depicted in FIG. 1 in that the controller 500 further comprises a billing module 510. The billing module 510 is a software or hardware component that may be implemented on-board and that allows the system control 130 to control the billing process. Thus, the billing module 510 together with the system control 130 form a billing control unit of the printing system.

Figure 6:
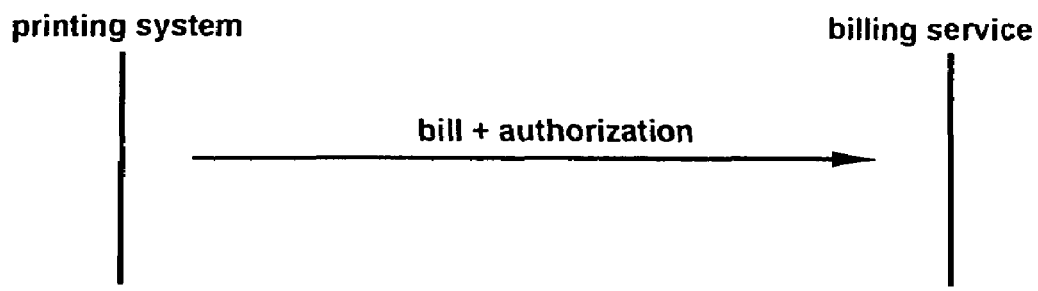
FIG. 6 is a sequence diagram illustrating the information flow of the billing process according to the invention.

That is, the invention allows for generating bills locally by the printer so that there is no need to send product usage information from the printing system to the billing 25 service and to send back a bill from the billing service to the printing system. This can be seen more clearly from FIG. 6 which is an information flow diagram illustrating the process of the invention. Since the bill is generated directly by the printing system, the bill can be authorized before any transmission to the billing service is done. The printing system then sends the authorized billing details to the billing service.

Figure 7:
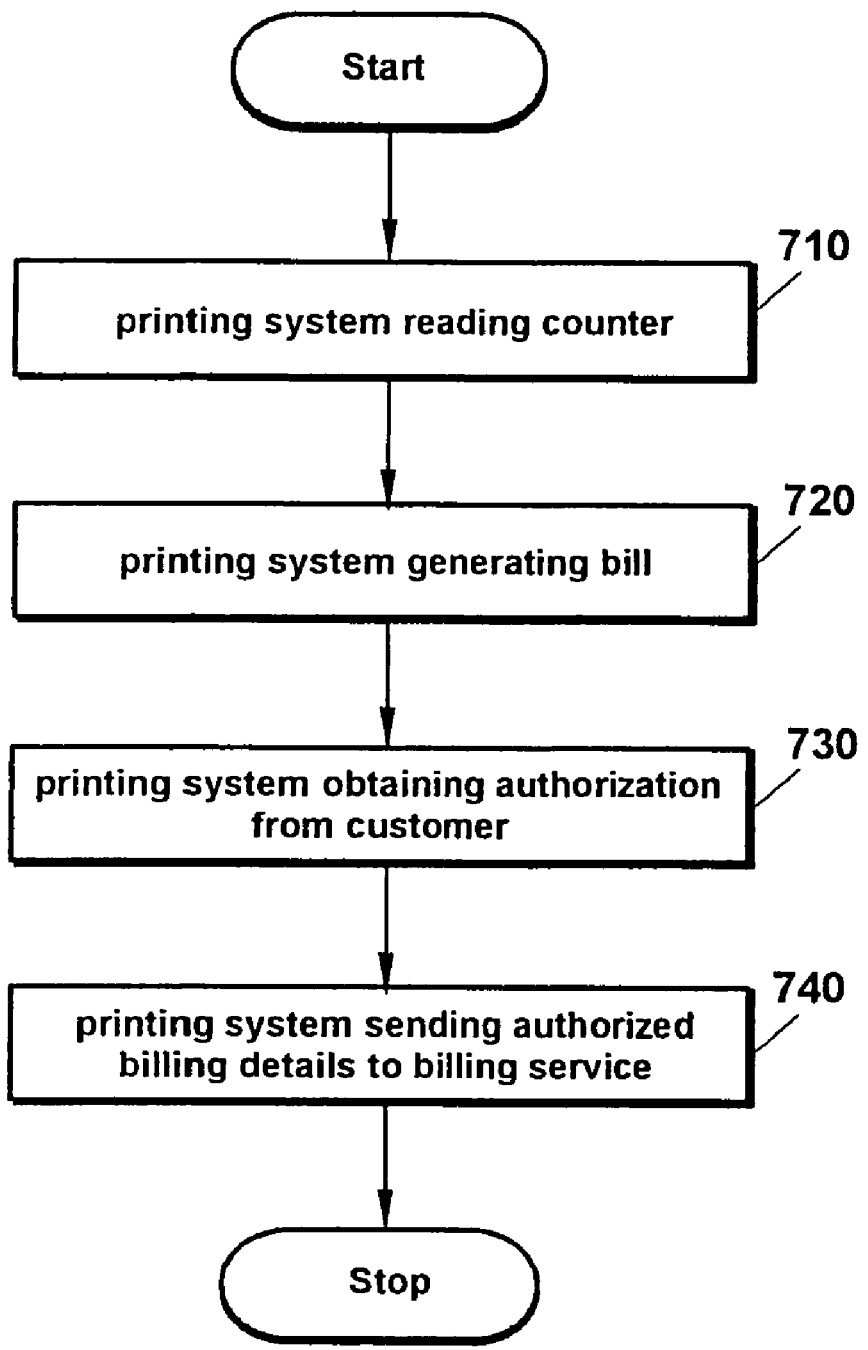
FIG. 7 is a flowchart illustrating the billing process according to an embodiment of the present invention.

A first embodiment of the billing process according to the invention is illustrated in FIG. 7. In step 710, the printing system reads the internal counter of the printing system. The counter counts the copies or prints that have been produced by the customer of the printing system. The copy count is product usage data that indicates a measurement of the actual use of the printing system. Other common product usage data include meter readings, information on the use of printing sub-systems such as sub-units for binding, scanning, stapling, stitching, shrink wrapping, etc and a measure of the paper and toner consumption. This data is stored in memory 170 and read in step 710 by the system control unit 130 when executing the billing process under control of billing module 510.

The printing system then uses the read product usage data to calculate billing data and present a bill based on the billing data to the customer (step 720). The billing is data may include the amount of money to be paid by the customer, and the currency. In an alternative embodiment the billing data includes a value of an arbitrary unit that can be used by the printing system and/or the billing service to determine the amount of money to be paid by the customer. The bill that is presented by the printing system to the customer is displayed on the printing system's display such as a liquid crystal display. In another embodiment, the bill is presented to the customer by sending the bill through the network interface 180 to a remote computer system of the customer that then displays the bill on a computer monitor of the remote system.

After the bill is generated and presented to the customer, the printing system obtains the authorization from the customer in step 730. If the bill was presented to the customer using the printing system's liquid crystal display, authorization may be done by the customer by using the keyboard of the printing system. If the display of the printing system is a touch screen, the customer might use the display itself to authorize the bill. If the bill is presented to the customer using a remote computer system, the customer uses the keyboard of the remote computer system for entering his authorization, and authorization data are then sent back to the printing system using network interface 180. Authorization may also be performed as a default option, i.e., if the customer has not rejected or modified proposed billing within a specified time then the billing data is deemed accepted and the bill authorized.

When the customer has authorized the presented bill in step 730, the printing system sends a message to the billing service for informing the billing service on the billing data and the authorization by the customer. The message may be sent via phone line or via internet in case the printing system is connected to the internet. This can for instance be the case if the printing system is connected to a local area network (LAN) by network interface 180 where the LAN is connected to the internet. Then, in one embodiment, the message including the authorized billing details may be sent from the printing system to the billing service by electronic mail. The message can be encrypted for security reasons.

The information that is sent from the printing system to the billing service in step 740 indicates the amount of money that the customer has authorized for payment. The message can further include electronic banking data that enables the billing service to debit the customer's account for settling the payment.

Figure 8:
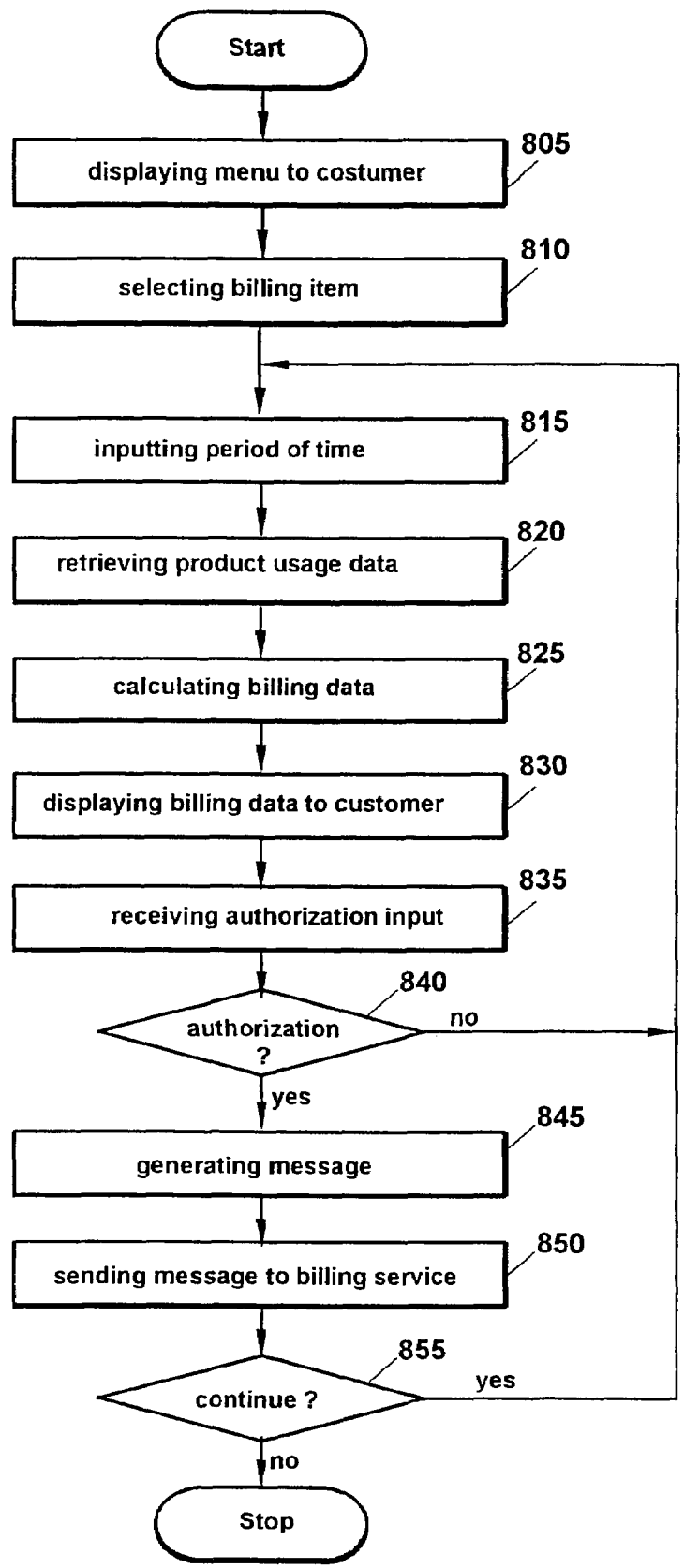
FIG. 8 is a flowchart illustrating the billing process according to another embodiment of the present invention.

A second, more detailed embodiment of how the billing process according to the invention can be performed is depicted in FIG. 8. In this process, a menu is displayed to the customer in step 805 using the liquid crystal display of the printing system or the computer monitor of a remote computer system. The menu includes several menu items such as a system configuration item, a service item and a billing item. The customer selects the billing item in step 810 to proceed with the billing process.

The customer is then requested in step 815 to input a period of time for which he wishes to proceed. For instance, if the customer wishes to pay for the copies or prints produced in the last month, the customer inputs the last month as period of time in step 815. There might be a default value that is chosen if the customer does not input a period of time in step 815. The default period may for instance be the period starting from the day of last payment and ending at the end of the last month or quarter.

After the period of time has been determined in step 815, the printing system retrieves the product usage data from memory 170 in step 820 and calculates the billing data in step 825. After displaying a bill to the customer in step 830 based on the billing data, the printing system receives an input from the customer in step 835 indicating whether the customer authorizes the bill or not. If the customer has input an authorization, the printing system decides in step 840 to proceed with generating and sending the authorized billing details to the billing service in steps 845 and 850. If the customer fails to authorize the bill, or if the customer decides in step 855 to proceed with the billing process, for instance to pay for the copies or prints produced in another period of time, the process returns to step 815.

As mentioned above, the message sent from the printing system to the billing service to inform the billing service on the authorized billing details might be encrypted for security reasons. Further, extra security can be provided by requiring the customer to enter a password when selecting the billing item of the menu or when authorizing the bill. Further, the printing system might include a fingerprint identification option that further increases the process security.

As apparent from the foregoing, the present invention has many advantages that derive from generating print volume bills locally at the printing system. One advantage is that there is only one message transmission necessary so that the billing process is expedited and simplified so that the risk of transmission errors is reduced. Another advantage is that the invention provides a paperless billing technique that leads to low billing and administration costs. Further, the invention can be easily implemented since the bill is generated by the printing system just by using a software or hardware module and the pre-existing printer user interface. Finally, security provisions can be easily enabled for instance through fingerprint identification.

While the invention has been described with respect to the physical embodiments constructed in accordance therewith, it will be apparent to those skilled in the art that various modifications, variations and improvements of the present invention may be made in the light of the above teaching and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A method of performing a billing process for the copies or prints produced by a customer of a printing system, the method comprising:
   a) in the printing system, storing product usage data indicating measurement of the actual use of the printing system;
   wherein the product usage data is determined based on actual use of the printing system, including at least one of:
      (1) meter readings;
      (2) paper consumption;
      (3) toner consumption;
      (4) use of a binding sub-unit;
      (5) use of a scanning sub-unit;
      (6) use of a stapling sub-unit; and
      (7) use of a shrink-wrapping sub-unit;
   b) in the printing system, locally accessing the memory to retrieve said product usage data;
   c) in the printing system, locally calculating billing data using the retrieved product usage data;
   d) in the printing system, presenting a bill to the customer based on said billing data;
   e) in the printing system, receiving authorization information indicating whether the customer authorizes the billing data, wherein on the condition that authorization information is not input during a predetermined period of time, default authorization information is generated indicating that the customer authorizes the billing data; and
   f) if said authorization information indicates that the customer has authorized the billing data, sending an encrypted message from the printing system to a billing service over a network, the encrypted message including information indicating the authorized billing data.

2. The method of claim 1, wherein the steps of presenting a bill to the customer and receiving authorization information from the customer are performed without communicating over a network.

3. The method of claim 1, wherein the step of receiving authorization information further comprises in response to an absence of user input, generating default authorization input within the printing system.

4. The method of claim 1 wherein said retrieved product usage data indicating a measurement of the actual use of the printing system is a count value indicating the number of copies or prints produced by the customer of the printing system over a period of time.

5. The method of claim 4, further comprising:
   in the printing system, receiving input from the customer specifying a period of time of actual use of the printing system, wherein the product usage data retrieved by locally accessing the memory corresponds to product usage data over the period of time of actual use specified by the customer.

6. The method of claim 1, wherein the step of calculating the billing data is initiated by the customer.

7. The method of claim 1, wherein said message is sent from the printing system to the billing service via a phone line.

8. The method of claim 1, wherein said message is sent from the printing system to the billing service via the internet.

9. The method of claim 8, wherein said message is an electronic mail message.

10. The method of claim 1, wherein said message includes electronic banking data authorizing the billing service to debit from the customer's account.

11. The method of claim 1, further comprising:
   a) in the printing system, receiving user input from the customer indicating a password;
   b) wherein the step of sending said encrypted message from the printing system to a billing service is performed only if the correct password has been entered by the customer.

12. The method of claim 1, further comprising:
   a) in the printing system, performing a fingerprint identification to ensure that the billing data is authorized by the correct person; and
   b) wherein the step of sending said message from the printing system to the billing service is performed only if the fingerprint identification has revealed that the billing data is authorized by the correct person.

13. A printing system comprising:
   a) a memory storing product usage data indicating a measurement of the actual use of the printing system by a customer without communicating over a network;
   wherein the product usage data is determined based on actual use of the printing system, including at least one of:
      (1) meter readings;
      (2) paper consumption;
      (3) toner consumption;
      (4) use of a binding sub-unit;
      (5) use of a scanning sub-unit;
      (6) use of a stapling sub-unit; and
      (7) use of a shrink-wrapping sub-unit;
   b) a billing control unit for locally accessing the memory to retrieve product usage data over a period of time and for calculating billing data using the retrieved product usage data without communicating over a network;
   c) a user interface message delivery subsystem for presenting a bill to the customer based on said billing data and for receiving user input from the customer indicating whether the customer authorizes the billing data wherein on the condition that authorization information is not input during a predetermined period of time, default authorization information is generated indicating that the customer authorizes the billing data; and d) a message sending unit for sending an encrypted message from the printing system to a billing service over a network if said user input indicates that the customer has authorized the billing data, the message including information indicating the authorized billing data.

14. The printing system of claim 13, wherein the user interface message delivery subsystem comprises a user interface unit integrated with the printing system that interfaces with a user without communicating over a network.

15. The printing system of claim 14, wherein said retrieved product usage data indicating a measurement of the actual use of the printing system is a count value indicating the number of copies or prints produced by the customer of the printing system over a period of time.

16. The printing system of claim 13, further comprising a fingerprint identification unit for performing a fingerprint identification process to ensure that the billing data is authorized by the correct person.

17. The printing system of claim 13, wherein said message sending unit is arranged for sending said message via a phone line.

18. The printing system of claim 13, wherein said message sending unit includes circuitry for connecting the printing system to the internet.

19. The printing system of claim 18, wherein said circuitry includes a LAN interface unit.

\* \* \* \* \*